United States Patent Office 3,156,530
Patented Nov. 10, 1964

3,156,530
PREPARATION OF DECABORANE
Lawrence J. Edwards, Zelienople, John M. Criscione, Butler, and Richard K. Pearson, Zelienople, Pa., assignors to Callery Chemical Company, Pittsburgh, Pa., a corporation of Pennsylvania
No Drawing. Filed Mar. 13, 1958, Ser. No. 721,321
7 Claims. (Cl. 23—204)

This invention relates to an improved method of preparing decaborane, $B_{10}H_{14}$, and more particularly to its preparation by the pyrolysis of diborane, $B_2H_6$.

Diborane pyrolyzes to produce a number of higher borane products including decaborane and solid polymers of boron and hydrogen. Decaborane heretofore has been recovered in very low yields by subliming or extracting it from the solid products formed by such pyrolysis. Decaborane has been shown to be useful as a curing agent used in vulcanizing rubbers and silicone gums. However, because of the lack of a suitable method of preparing decaborane at reasonable cost there has been no extensive commercial utilization of it.

It is therefore an object of this invention to provide a simple, economical method of preparing decaborane. A more specific object is to provide a method of preparing decaborane in good yields from the pyrolysis of diborane. Other objects will become apparent from the discussion and claims hereinafter related.

This invention is predicated on the discovery that the pyrolysis reactions of diborane can be selectively controlled to yield predominantly decaborane by pyrolyzing the diborane between adjacent surfaces, one surface maintained at an elevated temperature above about 200° C., and the other surface maintained at below about 40° C. These surfaces will hereinafter be referred to as the hot surface and the cold surface respectively. The decaborane formed by the pyrolysis freezes and collects on the cold surface of the reactor. The product is easily recovered by continuously or intermittently washing the cold surface with a solvent for decaborane, discharging the solution, and recovering the decaborane from solution; or it may be mechanically removed from the reactor by a scraper or washing with an inert liquid.

The adjacent hot and cold surfaces are most conveniently provided by using concentric tubes to give a reaction zone of annular cross section. A hot fluid is passed through the inner tube to heat the inside reactor surface, and the outside tube is jacketed so that it may be cooled. Similarly, the inside tube may be cooled and the outside tube heated if desired. The annular reactor zone is provided with suitable inlet and outlet connections, and isolated from atmospheric contamination since diborane is hydrolyzed by water vapor and forms explosive mixtures with air. Other methods of providing adjacent hot and cold surfaces are equally satisfactory, such as heating and cooling the opposite sides of a reactor of rectangular cross section.

Continuous pyrolysis reactions are evaluated primarily on two yield considerations: (1) the ultimate yield defined as the amount of reactant converted to the desired product divided by the total amount of reactant converted, i.e., $B_2H_6$ equivalent of $B_{10}H_{14}$ formed/$B_2H_6$ consumed; and (2) the yield per pass defined as the amount of reactant converted to the desired product divided by the amount of reactant fed, i.e., $B_2H_6$ equivalent of $B_{10}H_{14}$ formed/$B_2H_6$ fed. The yields herein are based on the overall equation $$5B_2H_6 \rightarrow B_{10}H_{14} + 8H_2$$

When diborane is pyrolyzed between adjacent hot and cold surfaces according to this invention higher ultimate yields and yields per pass are obtained than by other pyrolysis methods used heretofore. Various process parameters such as the hot and cold surface temperatures, the distances between the two surfaces, the relative areas of the hot and cold surfaces, and the residence time affect the yield of decaborane. These variables are interrelated so that yields may be maximized at a number of different specific conditions. The nature of the effects of change in these parameters is hereinafter discussed in detail.

As the hot surface temperature is increased from about 200° C. there is an increase in ultimate yield and yield per pass, which passes through an optimum, and further increase in temperature results in decreased yields. This is illustrated by the results set forth in Table I from reactions performed with a distance between the hot and cold surfaces of 10 millimeters, a ratio of hot surface area to cold surface area of 0.44, a cold surface temperature of 20° C., a reactor volume of 550 ml., and a diborane feed rate (measured at 25° C. and 1 atmosphere pressure) of 10–13 cc. per minute.

*Table I*

| Hot Surface Temp. (° C.) | Decaborane Yield | |
|---|---|---|
| | Yield Per Pass | Ultimate Yield |
| 150 | 0.7 | 5.4 |
| 200 | 36.4 | 51.1 |
| 230 | 47.5 | 61.6 |
| 250 | 65.0 | 68.0 |
| 275 | 75.5 | 77.0 |
| 280 | 70.5 | 72.0 |

It is generally preferred to maintain the hot wall temperature below about 300° C. since at higher temperatures there are substantial losses to boron-hydrogen solid polymeric materials. The optimum hot surface temperature varies from about 230 to 280° C., dependent on changes in the other above mentioned process parameters. For example, from reactions with the same process parameters as above, except that the hot surface area to cold surface ratio was 2.27 rather than 0.44, it was determined that the optimum hot surface temperature was about 235 to 250° C. At 235° C. the ultimate yield of decaborane was 84.3% and the yield per pass was 80.7%; at 255° the ultimate yield and yield per pass were 81.5% and 79.8% respectively.

There is an increase in the yield of decaborane when the distance between the adjacent hot and cold surfaces is decreased. Results from reactions using an annular cross section reactor in which the diameter of the inside tube was charged to give different spacings between the hot and cold surfaces illustrate this effect and are set forth in Table II. The diborane feed rates in these reactions was 63 cc./min. (at 25° C.), and the cold surface temperature was 18° C.

*Table II*

| Hot Wall Temp. (° C.) | Distance Between Hot and Cold Surfaces (mm.) | Yield Per Pass (percent) | Ultimate Yield (percent) |
|---|---|---|---|
| 250° | 34 | 47.3 | 55 |
| | 15 | 49 | 58 |
| | 8.7 | 54.8 | 65 |
| 275° | 47 | 40.5 | 43 |
| | 34 | 49.7 | 54 |
| | 15 | 56.5 | 62 |
| | 8.7 | 66.4 | 73 |

With longer residence time, i.e., lower diborane feed rates, the magnitude of the effect of changing the distance between the hot and cold surfaces is lessened. For example, in reactions as above with a 250° C. hot surface temperature, and a diborane feed rate of 10 cc./minute, the ultimate yield was 78% with a 47 mm. spacing and 83% with an 8.7 mm. spacing, and the yield per pass was 71.5% with 47 mm. spacing and 71.9% with 8.7 mm. spacing. Generally, it is preferred to have the hot and cold surfaces separated by less than about 30 mm.

Good yields of decaborane are obtained at residence times in excess of about 3 minutes; yields generally increase with increasing residence times up to about ½ hour, and are not decreased by much longer residence times except when very high hot wall temperatures are used, e.g., 300° C. The results set forth in Table III illustrate the effectiveness of the method over a wide range of residence times. A diborane feed rate of 80 cc./min. into a 550 ml. reactor is equivalent to an actual residence time of about 3 minutes, when adjusted for the increase in average gas temperature in the reactor and the increase in gas volume caused by the generation of hydrogen in the pyrolytic reaction. The results were obtained from reactions with a hot surface temperature of 280° C., a cold surface temperature of 20° C., a 14 mm. spacing, a hot surface to cold surface area ratio of 0.44, and a 550 ml. reactor volume.

*Table III*

| Diborane Feed Rate (cc. at 25° C. and 1 atm./min.) | Yield Per Pass $B_{10}H_{14}$ | Ultimate Yield $B_{10}H_{14}$ |
| --- | --- | --- |
| 80 | 51.5 | 56.3 |
| 50 | 63.0 | 64.8 |
| 32 | 68.5 | 70.8 |
| 11 | 70.5 | 72.0 |

At very short residence times the per pass yield of decaborane is lower, primarily because only a small proportion of the diborane fed is converted or pyrolyzed. It is generally preferred to use a volume feed rate per minute of diborane equal to about 2% to 5% of the reactor volume, which is equivalent to a residence time of approximately 10 to 25 minutes.

The cold surface temperature may be any temperature below about 40° C. since at higher temperatures the decaborane is not effectively condensed on the cold surface. It is most convenient to maintain the cold surface at ambient temperature. The optimum hot wall temperature is dependent on the cold wall temperature as well as other process parameters; at any specified process parameters the optimum hot wall temperature decreases with increasing cold wall temperatures.

Some liquid higher boranes, e.g., pentaborane-9, and solid polymeric borane materials are formed by the pyrolysis reactions. Thus if the ultimate yield of decaborane is 80%, 20% of the diborane was consumed forming other liquid and solid products. With lower hot surface temperatures, and at short residence times these other pyrolysis products are predominantly liquid boranes. At higher temperatures and long residence times they are predominantly solid borane polymeric materials.

According to the provisions of the patent statutes, we have explained the principle and mode of practicing our invention, have described what we now consider to be its best embodiments. However, we desire to have it understood that, within the scope of the appended claims, the invention may be practiced otherwise than as specifically described.

We claim:

1. In a method of producing decaborane by the pyrolysis of diborane, the improvement which comprises carrying out the pyrolysis by simultaneously exposing a flowing stream of diborane to both a hot surface and a cold surface in juxtaposition, said hot surface being at a temperature above about 200° C. and said cold surface being at a temperature below about 40° C.

2. A method according to claim 1 in which the hot surface temperature is between about 200° C. and 300° C.

3. A method according to claim 1 in which the distance between the hot and cold surfaces is less than about 30 millimeters.

4. A method according to claim 1 in which the volume feed rate of diborane per minute is between about 2% to 5% of the volume of the reaction zone.

5. A method of preparing decaborane which consists essentially of continuously introducing diborane into a reaction zone comprising juxtaposed hot and cold surfaces whereby the diborane is simultaneously exposed to the hot and cold surfaces at such a rate that the residence time is more than about 3 minutes, maintaining the hot surface temperature at between about 235 and 280° C., and maintaining the cold surface temperature at below about 40° C., and recovering the decaborane formed.

6. A method of preparing decaborane which consists essentially of continuously feeding diborane to a closed reaction zone, said reaction zone comprising the annular space between two concentric tubes, maintaining one of said tubes at a temperature between about 200 and 300° C., and maintaining the other said tube at a temperature below about 40° C. and recovering the decaborane formed.

7. A method of preparing decaborane which consists essentially of continuously feeding diborane to a closed reaction zone, said reaction zone comprising the annular space formed between two concentric tubes, the radius of the outer tube being less than about 30 millimeters larger than the radius of the inner tube, maintaining the outer tube at a temperature of between about 235 and 280° C., maintaining the inner tube at a temperature of less than about 40° C., feeding the diborane at a volume feed rate per minute equal to about 2% to 5% of the reactor volume, and recovering the decaborane formed.

References Cited in the file of this patent

UNITED STATES PATENTS 2,553,198  Lesesne _____ May 15, 1951
2,857,248  Shapiro _____ Oct. 21, 1958

OTHER REFERENCES

Koski et al.: "Anal. Chem.," vol. 26, No. 12, pages 1992–1994, December 1954.

Schlesinger et al.: "Chem. Reviews," vol. 3, page 13, August 1942.

Siegel et al.: "Chem. Education," vol. 34, pages 316, 317, July 1957.

Schechter et al.: "Boron Hydrides and Related Compounds," pages 13, 37, March 1951. Declassified January 5, 1954, Dept. of Navy, Bureau of Aeronautics.

Stock: "Hydrides of Boron and Silicon," pages 81, 82, Cornell University Press, 1933.